US012094672B2

(12) United States Patent
Nakatani et al.

(10) Patent No.: US 12,094,672 B2
(45) Date of Patent: Sep. 17, 2024

(54) ELECTRIC CIRCUIT BREAKER DEVICE

(71) Applicant: Pacific Engineering Corporation, Gifu (JP)

(72) Inventors: Takenao Nakatani, Gifu (JP); Hiroyasu Yokoi, Gifu (JP); Yusuke Kondo, Gifu (JP)

(73) Assignee: Pacific Engineering Corporation, Gifu (JP)

( * ) Notice: Subject to any disclaimer, the term of this patent is extended or adjusted under 35 U.S.C. 154(b) by 150 days.

(21) Appl. No.: 17/793,472

(22) PCT Filed: Feb. 18, 2021

(86) PCT No.: PCT/JP2021/006060
§ 371 (c)(1),
(2) Date: Jul. 18, 2022

(87) PCT Pub. No.: WO2021/220588
PCT Pub. Date: Nov. 4, 2021

(65) Prior Publication Data

US 2023/0066646 A1 Mar. 2, 2023

(30) Foreign Application Priority Data

Apr. 30, 2020 (JP) ................................ 2020-080298

(51) Int. Cl.
*H01H 39/00* (2006.01)
*H01H 73/18* (2006.01)

(52) U.S. Cl.
CPC .......... *H01H 39/004* (2013.01); *H01H 73/18* (2013.01)

(58) Field of Classification Search
CPC ...... H01H 39/00; H01H 39/004; H01H 73/00; H01H 73/02; H01H 73/06; H01H 73/18;
(Continued)

(56) References Cited

U.S. PATENT DOCUMENTS

2021/0233729 A1* 7/2021 Nakatani .............. H01H 39/006

FOREIGN PATENT DOCUMENTS

| | | |
|---|---|---|
| CN | 210403648 | 4/2020 |
| JP | 2019-029152 | 2/2019 |
| JP | 2019-212612 | 12/2019 |

OTHER PUBLICATIONS

International Search Report (+ English translation) and Written Opinion of the International Searching Authority completed Apr. 15, 2021, in International Patent Application No. PCT/JP21/06060, 9 pages.

* cited by examiner

*Primary Examiner* — Anthony R Jimenez
(74) *Attorney, Agent, or Firm* — Lowe Graham Jones PLLC

(57) ABSTRACT

Electric circuit breaker device that can be downsized by reducing the distance the moving body moves, including a housing; a cut part placed inside the housing; and a power source placed on the housing, further including a moving body having a first arc-extinguishing space into which the cut part is inserted and housed, and which is filled with an arc-extinguishing material, and a moving body housing part that allows the moving body to move between the first end part and a second end part opposite to the first end part, which is configured to cut the cut part while moving toward the power source P, and the housing includes an expanded arc-extinguishing space positioned so as to face an end part of a separable piece of the cut part when the moving body has moved and stopped, and the expanded arc-extinguishing space being filled with an arc-extinguishing material.

4 Claims, 11 Drawing Sheets

(58) Field of Classification Search
CPC .. H01H 1/64; H01H 9/30; H01H 9/46; H01H 33/04; H01H 33/08; H01H 33/53; H01H 33/72
USPC ........................................................ 200/61.08
See application file for complete search history.

ELECTRIC CIRCUIT BREAKER DEVICE

PRIORITY CLAIM

This application is a U.S. national phase of International Patent Application No. PCT/JP2021/006060 filed Feb. 18, 2021; which claims the benefit of priority from Japanese Patent Application No. 2020-080298 filed Apr. 30, 2020, the contents of which are incorporated by reference.

FIELD OF THE INVENTION

The present invention relates to an electric circuit breaker device that can be mainly used in an electric circuit of an automobile or the like.

BACKGROUND OF THE INVENTION

Conventionally, electric circuit breaker devices have been used to protect electric circuits installed in automobiles or the like and various electric components connected to the electric circuits. Specifically, when an abnormality occurs in the electric circuit, the electric circuit breaker device cuts a part of the electric circuit to physically interrupt the electric circuit.

There are various types of electric circuit breaker devices. For example, an electric circuit breaker device disclosed in Patent Literature 1 includes a housing; a part to be cut that is placed inside the housing and forms a part of an electric circuit; a power source placed on the side a first end part of the housing; and a moving body that includes a first arc-extinguishing space in which the part to be cut is inserted and housed, and in which an arc-extinguishing material is filled, wherein the housing includes a moving body housing part that allows the moving body to move between the first end part and a second end part opposite to the first end part, and the moving body is configured to cut the part to be cut housed in the first arc-extinguishing space of the moving body while being moved from the first end part toward the second end part by the power source. Then, by moving the moving body, the separable piece of the part to be cut that is cut off and separated is moved away from the main body parts of the part to be cut remaining in the housing without being separated so that the arcs generated between them are physically elongated and interrupted.

However, since the generated arcs are extinguished by physically elongating them, it is necessary to secure a long moving distance for the moving body, and accordingly, the total length of the moving body housing part housing the moving body and the housing increases. As a result, the size of the electric circuit breaker device as a whole may increase.

CITATIONS LIST

Patent Literature

Patent Literature 1: JP 2019-212612 A

SUMMARY OF THE INVENTION

Technical Problems

In view of the above problem, the present invention provides an electric circuit breaker device that can be downsized by reducing the distance the moving body moves.

Solutions to Problems

An electric circuit breaker device of the present invention includes: a housing; a part to be cut that is placed inside the housing and forms a part of an electric circuit; and a power source placed on the side of a first end part of the housing, the electric circuit breaker device further includes a moving body that includes a first arc-extinguishing space in which the part to be cut is inserted and housed, and which is filled with an arc-extinguishing material, wherein the housing includes a moving body housing part that allows the moving body to move between the first end part and a second end part opposite to the first end part, the moving body is configured to cut the part to be cut housed in the first arc-extinguishing space of the moving body while moving from the first end part toward the second end part by the power source, and the housing includes an expanded arc-extinguishing space positioned so as to face an end part of a separable piece of the part to be cut that is cut off and separated, when the moving body has moved and stopped, the expanded arc-extinguishing space being filled with an arc-extinguishing material.

According to these features, when the moving body has moved and stopped, the end part of the cut-off separable piece faces the expanded arc-extinguishing space, so that an arc generated between the end part of the separable piece and the main body part is effectively extinguished by the arc-extinguishing material in the expanded arc-extinguishing space. Since there is no need to secure a long moving distance for the moving body in order to physically elongate and extinguish the arc as in the related art, the present invention enables downsizing of the electric circuit breaker device by reducing the moving distance of the moving body.

The electric circuit breaker device of the present invention is characterized in that a part of the moving body directly or indirectly abuts on a part of the moving body housing part to stop the moving body.

According to this feature, since a part of the moving body directly or indirectly abuts on a part of the moving body housing part so that the moving body can be stopped with higher reliability, it is possible to suppress the variation in the moving distance of the moving body or the state of the separable piece after moving the moving body (such as the distance by which it has been separated from the main body part and the positional relationship of the separable piece with the expanded arc-extinguishing space) caused by a variation in the voltage or the amount of explosive in the power source P. This stabilizes the arc-extinguishing performance and the quality of the electric circuit breaker device.

The electric circuit breaker device of the present invention is characterized in that the part to be cut includes a plurality of separable pieces, and when the moving body has moved and stopped, an end part of at least one of the separable pieces faces the expanded arc-extinguishing space, and an end part of the remaining one or more separable pieces faces an intermediate expanded space provided in the housing and filled with an arc-extinguishing material.

According to this feature, arcs generated between end parts of the separable pieces and the main body part are effectively extinguished by the arc-extinguishing material in the expanded arc-extinguishing space and the intermediate expanded space. The electric circuit breaker device can be downsized by reducing the moving distance of the moving body.

Advantageous Effects of Invention

As described above, according to the electric circuit breaker device of the present invention, the electric circuit breaker device can be downsized by reducing the moving distance of the moving body.

BRIEF DESCRIPTION OF THE DRAWINGS

Preferred and alternative examples of the present invention are described in detail below with reference to the following drawings.

REFERENCE SIGNS LIST

Figure 1A:
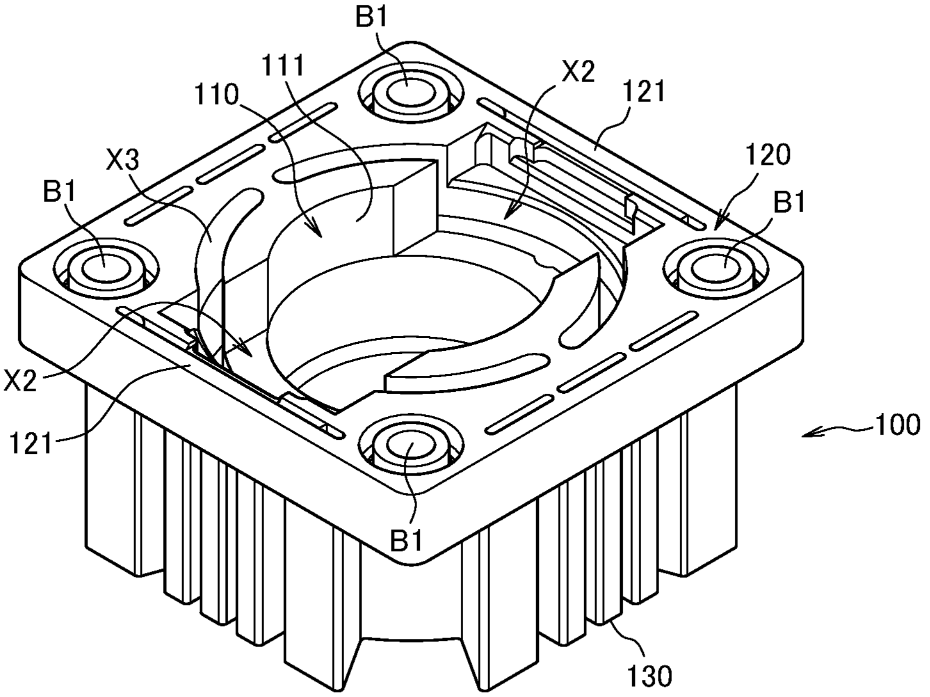
FIG. 1(*a*) is an overall perspective view of a lower housing forming a part of a housing of an electric circuit breaker device according to a first embodiment of the present invention, and FIG. 1(*b*) is a plan view of the lower housing.

300 Housing
310 Moving body housing part
320 First end part
330 Second end part
400 Part to be cut
420 Separable piece
422 End part
430 Main body part
500 Moving body
P Power source
X1 First arc-extinguishing space
X2 Expanded arc-extinguishing space
M Arc-extinguishing material

DETAILED DESCRIPTION OF THE PREFERRED EMBODIMENT

Embodiments of the present invention will be described with reference to the drawings. The shape, material, and the like of each member of the electric circuit breaker devices according to the embodiments described below are merely examples, and are not limited thereto.

First Embodiment

Figure 1B:
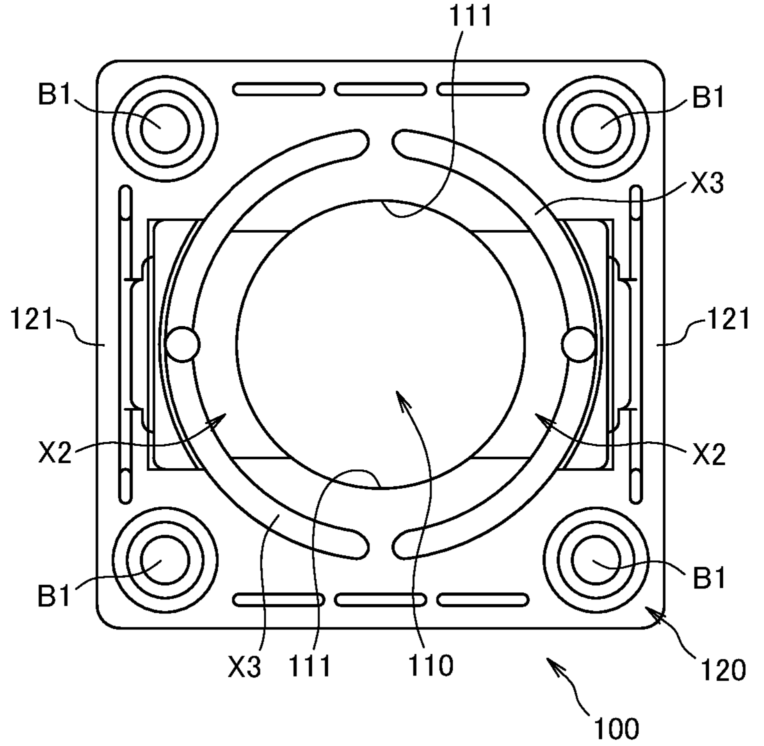

First, a lower housing 100 forming a part of a housing 300 according to a first embodiment of the present invention is illustrated in FIG. 1. FIG. 1(*a*) is an overall perspective view of the lower housing 100, and FIG. 1(*b*) is a plan view of the lower housing 100. The lower housing 100 is a substantially quadrangular prism member made of synthetic resin, and includes a cylindrical lower moving body housing part 110 and an outer arc-extinguishing space X3 formed in a substantially annular shape around the lower moving body housing part 110. The lower moving body housing part 110 extends from an upper surface 120 toward a lower surface 130 of the lower housing 100, and is configured to house a moving body 500 described later. The inner surface 111 of the lower moving body housing part 110 is a smooth curved surface so that the moving body 500 can slide up and down inside the lower moving body housing part 110. Further, parts of the upper end of the lower moving body housing part 110 are cut out to form an expanded arc-extinguishing space X2 communicating with the inside of the lower moving body housing part 110. The expanded arc-extinguishing space X2 has a concave shape formed by cutting out parts of the upper end of the lower moving body housing part 110, but is not limited thereto. The expanded arc-extinguishing space X2 can be provided anywhere in the housing 300 as long as the expanded arc-extinguishing space X2 faces end parts 422 of a cut-off separable piece 420 after moving and stopping the moving body 500 as described later.

The outer arc-extinguishing space X3 has the shape of a groove extending from the upper surface 120 toward the lower surface 130 of the lower housing 100, and is configured so that an arc-extinguishing material can be contained therein. The outer arc-extinguishing space X3 is formed in a substantially annular shape so as to surround the lower moving body housing part 110, but is not limited thereto.

In addition, flat support parts 121 are provided on the upper surface 120 of the lower housing 100 so that main body parts 430 of the part to be cut 400 described later can be rested thereon. The support parts 121 are provided on both sides of the upper surface 120 so as to face each other, and extend linearly along the expanded arc-extinguishing space X2. Therefore, the support parts 121 support the linearly extending part to be cut 400 on both sides, while the expanded arc-extinguishing space X2 is located below the main body parts 430 on both sides of the part to be cut 400. Further, coupling holes B1 are formed at the four corners of the upper surface 120 of the lower housing 100. The coupling holes B1 are arranged so as to be vertically aligned with coupling holes B2 of an upper housing 200 described later.

Figure 2A:
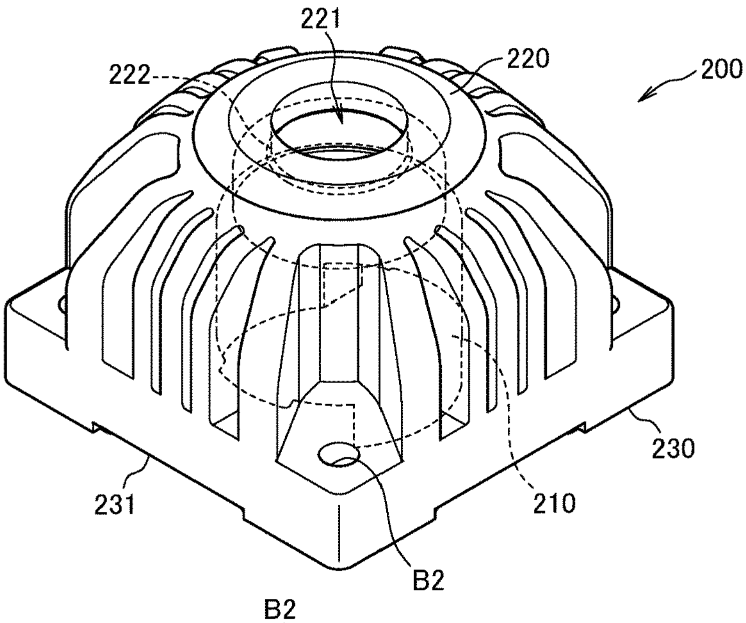
FIG. 2(*a*) is a perspective view of an upper housing forming a housing of the electric circuit breaker device according to the first embodiment of the present invention as viewed from the upper surface side, FIG. 2(*b*) is a perspective view of the upper housing as viewed from the lower surface side, and FIG. 2(*c*) is a bottom view of the upper housing.
Figure 2B:
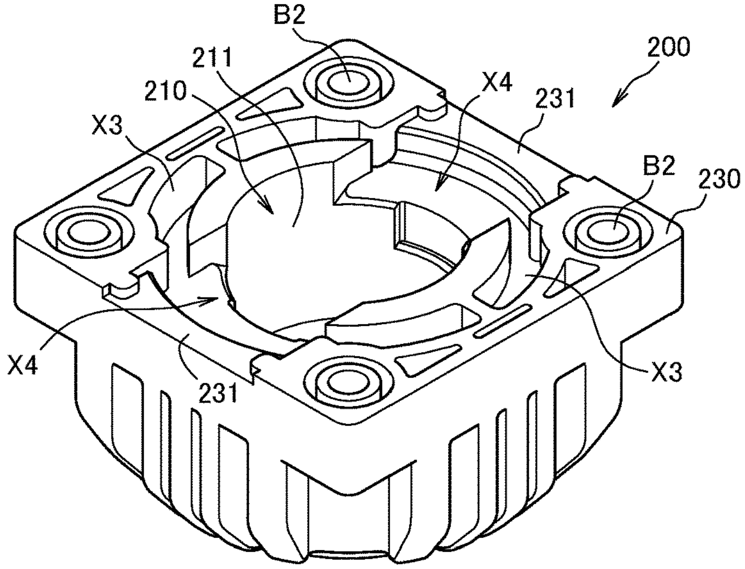
Figure 2C:
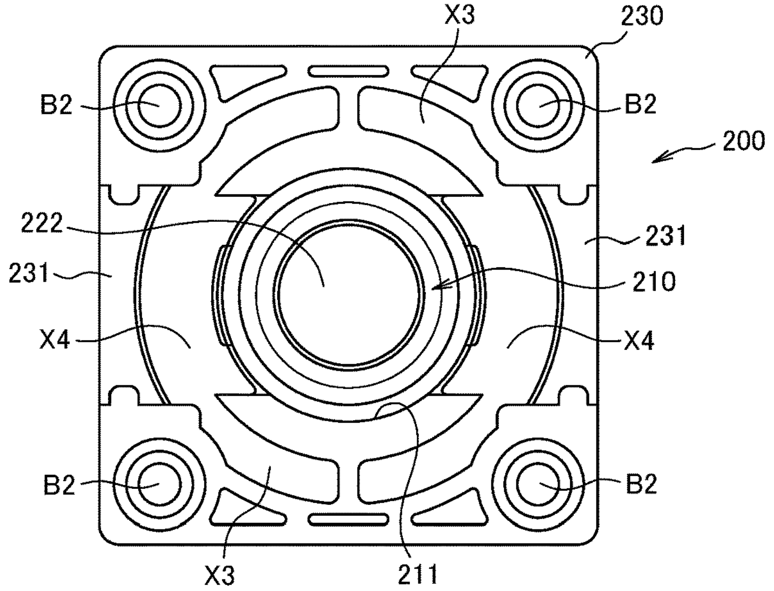

Next, the upper housing 200 forming a part of the housing 300 according to the first embodiment of the present invention is illustrated in FIG. 2. FIG. 2(*a*) is a perspective view of the upper housing 200 as viewed from the side of an upper surface 220. FIG. 2(*b*) is a perspective view of the upper housing 200 as viewed from the side of a lower surface 230. FIG. 2(*c*) is a bottom view of the upper housing 200.

The upper housing 200 is a substantially quadrangular prism member made of synthetic resin, and is used in a pair with the lower housing 100 illustrated in FIG. 1. The upper housing 200 includes a cylindrical upper moving body housing part 210 inside it, and an outer arc-extinguishing space X3 formed in a substantially annular shape around the upper moving body housing part 210. The upper moving body housing part 210 extends from the lower surface 230 toward the upper surface 220 of the upper housing 200, and is configured to house the moving body 500 described later. The inner surface 211 of the upper moving body housing part 210 is a smooth curved surface so that the moving body 500 can slide up and down therein. As will be described later, the upper moving body housing 210 is placed on top of the lower moving body housing part 110 of the lower housing 100 to form a moving body housing part 310 extending linearly. The inner diameter of the upper moving body housing part 210 coincides with the inner diameter of the lower moving body housing part 110. This allows the moving body 500 to move up and down smoothly in the moving body housing part 310. Further, a part of the lower end of the upper moving body housing part 210 is cut out to form an upper expanded space X4 communicating with the inside of the upper moving body housing part 210.

The outer arc-extinguishing space X3 has the shape of a groove and is configured so that an arc-extinguishing material can be contained therein. The outer arc-extinguishing space X3 of the upper housing 200 is provided at a position corresponding to the position of the outer arc-extinguishing space X3 of the lower housing 100. When the lower housing 100 and the upper housing 200 are coupled and fixed, the outer arc-extinguishing space X3 of the lower housing 100 and the outer arc-extinguishing space X3 of the upper housing 200 communicate with each other.

The lower surface 230 of the upper housing 200 includes recessed parts 231 recessed in accordance with the shape of the main body parts 430 of the part to be cut 400 described later. The recessed parts 231 are provided on both sides of the lower surface 230 so as to face each other, and extend linearly along the upper expanded space X4. The recessed parts 231 are provided at positions corresponding to the positions of the support parts 121 of the lower housing 100. Therefore, the main body parts 430 of the part to be cut 400 rested on the support parts 121 of the lower housing 100 can be fitted into the recessed parts 231 by covering the main body parts 430 with the recessed parts 231 from above. When the main body parts 430 of the part to be cut 400 are fitted in the support parts 121 of the upper housing 200, the upper expanded space X4 is located above the main body parts 430 on both sides of the part to be cut 400.

A power source housing part 221 for housing a power source P is formed in a part of the upper surface 220 of the upper housing 200. A coupling hole 222 communicating with the upper surface of the upper moving body housing part 210 is formed on the bottom surface side of the power source housing part 221. As will be described in detail later, power such as air pressure generated from the power source P housed in the power source housing part 221 is transmitted to the inside of the upper moving body housing part 210 through the coupling hole 222, and moves the moving body 500 in the upper moving body housing part 210. Although the lower housing 100 and the upper housing 200 are substantially quadrangular prism members made of synthetic resin, they are not limited thereto. The lower housing 100 and the upper housing 200 may be made of another material and have any shape as long as they have high insulation and sufficient strength for use.

Figure 3A:
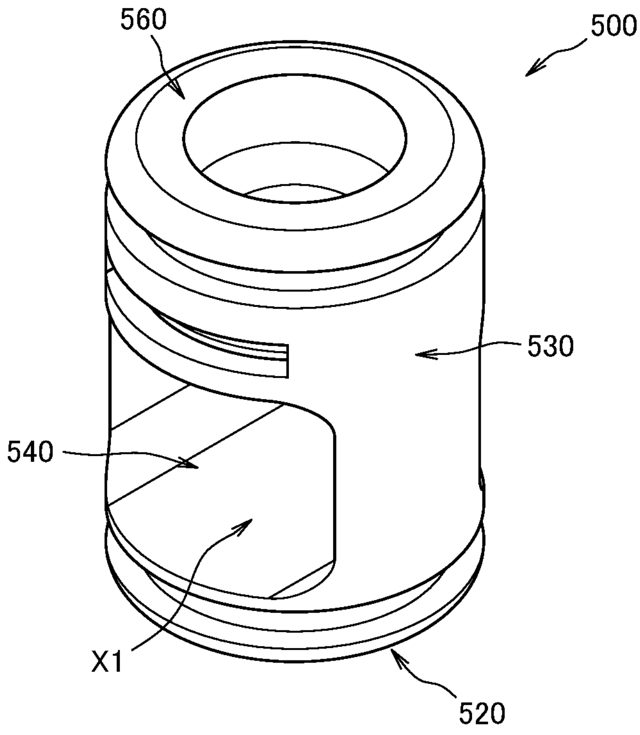
FIG. 3(*a*) is a perspective view of a moving body of the electric circuit breaker device according to the first embodiment of the present invention, and FIG. 3(*b*) is a front view of the moving body.
Figure 3B:
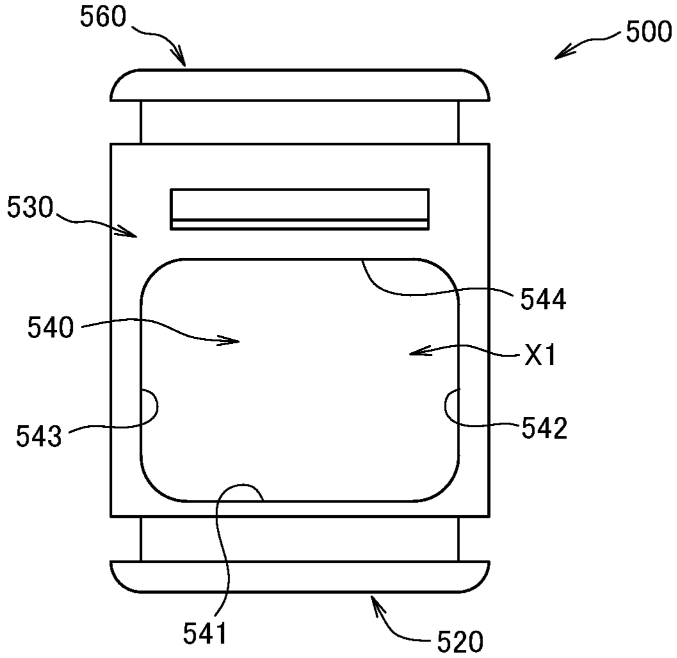

Next, the moving body 500 according to the first embodiment of the present invention is illustrated in FIG. 3. FIG. 3(*a*) is a perspective view of the moving body 500, and FIG. 3(*b*) is a front view of the moving body 500. The moving body 500 is a substantially cylindrical member made of synthetic resin including an upper part 560 and a lower part 520. Since the outer diameter of the moving body 500 is equal to or smaller than the inner diameter of the moving body housing part 310, and an outer surface 530 of the moving body 500 is a smooth surface with a shape corresponding to the shape of the inner surface of the moving body housing part 310, the moving body 500 can smoothly slide inside the moving body housing part 310 with no gap between them.

At about the center of the moving body 500, a penetrating part 540 is provided that penetrates the moving body 500 from one part of the outer surface 530 to the opposite part of the outer surface 530, that is, from the front surface to the back surface thereof. The penetrating part 540 is surrounded by a lower wall 541, a side wall 542, a side wall 543, and an upper wall 544. The space surrounded by the lower wall 541, the side wall 542, the side wall 543, and the upper wall 544 and recessed inward from the outer surface 530 serves as a first arc-extinguishing space X1. The separable piece 420 of the part to be cut 400 described later can be inserted and housed in the first arc-extinguishing space X1. Since the first arc-extinguishing space X1 is filled with the arc-extinguishing material described later, the separable piece 420 of the part to be cut 400 housed in the first arc-extinguishing space X1 can be completely surrounded by the arc-extinguishing material. Although the moving body 500 has a cylindrical shape and is made of synthetic resin, it is not limited thereto. The moving body 500 may be made of another material and have any shape as long as it has high insulation and sufficient strength for use.

Figure 4A:
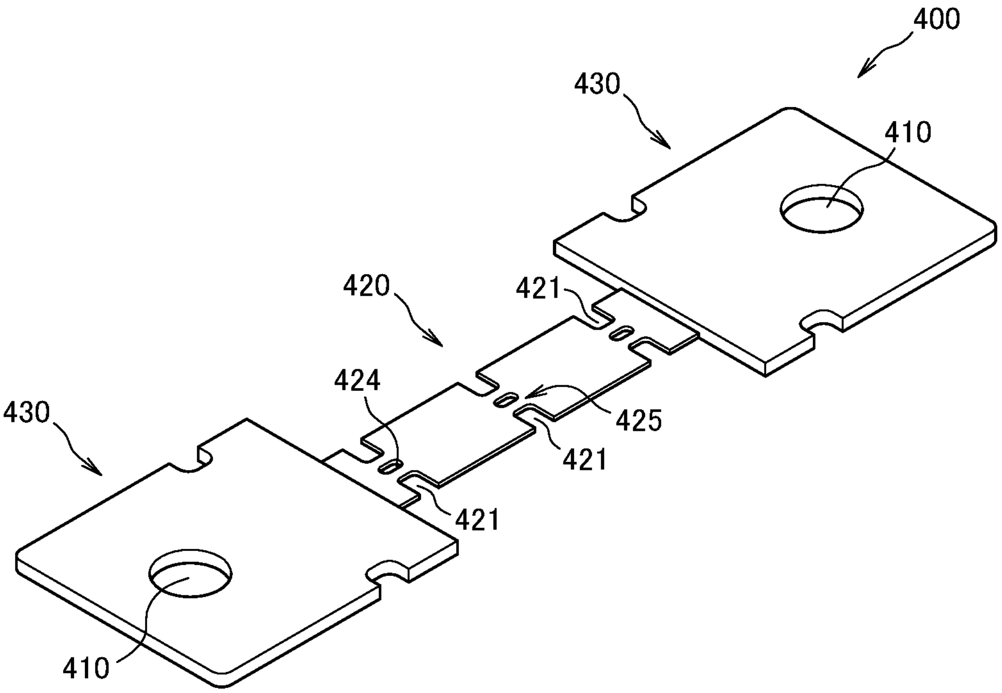
FIG. 4(*a*) is a perspective view of a part to be cut of the electric circuit breaker device according to the first embodiment of the present invention, and FIG. 4(*b*) is a plan view of the part to be cut.
Figure 4B:
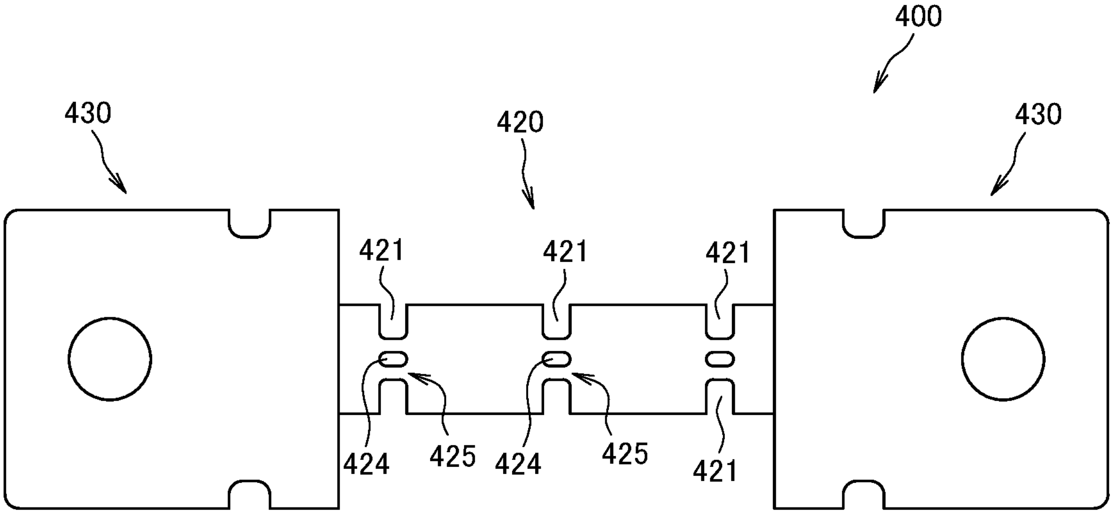

Next, the part to be cut 400 forming a part of an electric circuit to be interrupted by an electric circuit breaker device 600 according to the first embodiment of the present invention is illustrated in FIG. 4. FIG. 4(*a*) is a perspective view of the part to be cut 400, and FIG. 4(*b*) is a plan view of the part to be cut 400. The part to be cut 400 is entirely made of a metal conductor to be electrically connected with the electric circuit, and includes the main body parts 430 to be connected with the electric circuit at both ends, and the separable piece 420 to be cut and separated at about the center. A connection hole 410 used to establish connection with the electric circuit is formed in an end part of each main body part 430. At the center and both ends of the separable piece 420, cuts 421 and a through hole 424 are provided to form a fusible part 425 with a locally reduced width. When an abnormal current flows through the electric circuit, the fusible part 425 generates heat and blows. Therefore, the part to be cut 400 has a fuse function. Although the part to be cut 400 has a fuse function, it is not limited thereto. The part to be cut 400 may not have a fuse function and may have only a function of being cut by the electric circuit breaker device 600 when a predetermined second excessive current flows.

Figure 5:
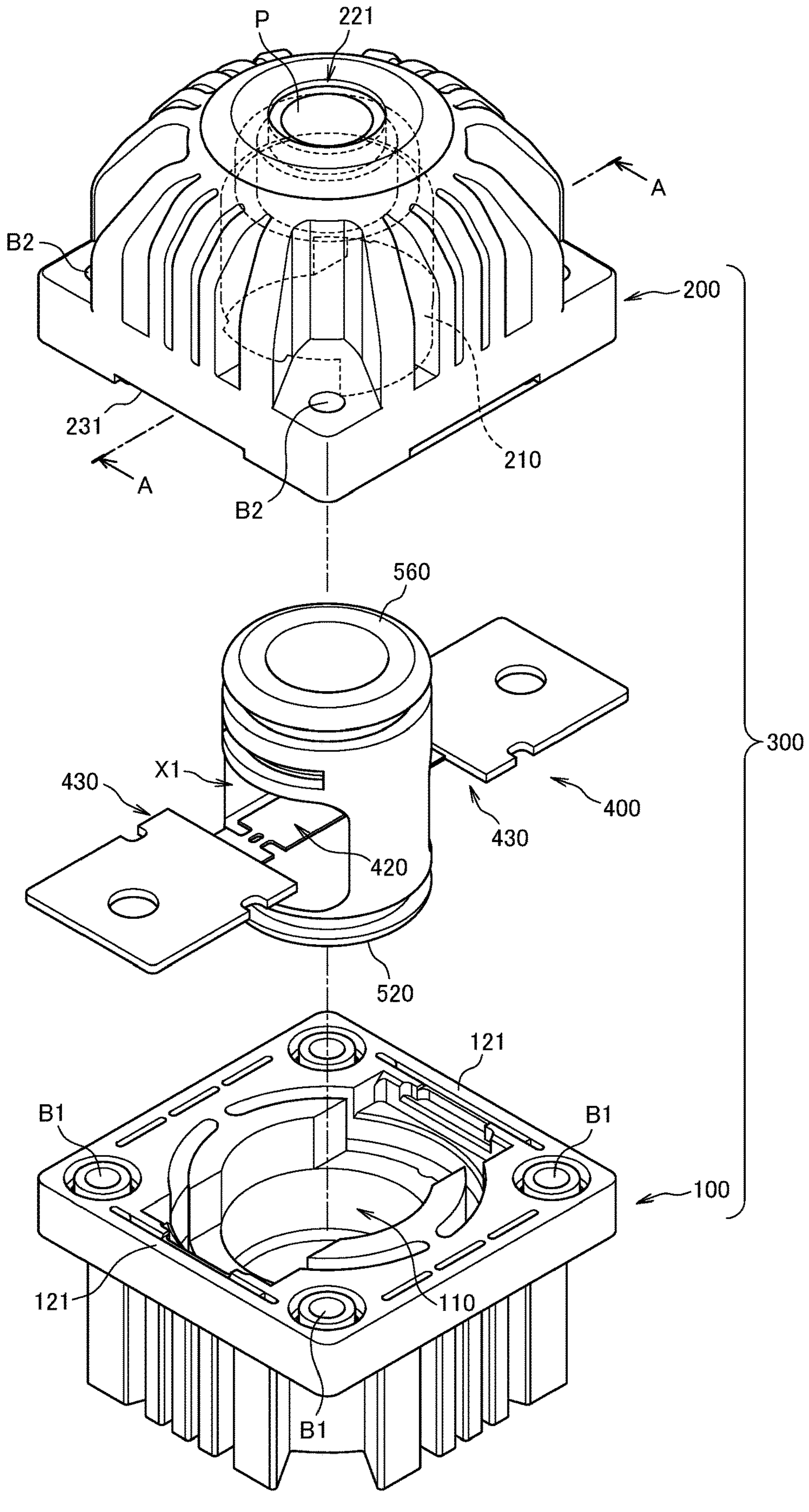
FIG. 5 is an exploded perspective view of the electric circuit breaker device according to the first embodiment of the present invention.

Next, how to assemble the electric circuit breaker device 600 of the present invention will be described with reference to FIG. 5. FIG. 5 shows an exploded perspective view of the electrical circuit breaker device 600.

First, the main body parts 430 of the part to be cut 400 are inserted into the first arc-extinguishing space X1 of the moving body 500, and the part to be cut 400 is moved forward until the separable piece 420 of the part to be cut 400 is housed in the first arc-extinguishing space X1 of the moving body 500.

Next, the moving body 500 in which the part to be cut 400 is housed is inserted into the lower moving body housing part 110 of the lower housing 100 from the lower part 520 side. Then, the main body parts 430 of the part to be cut 400 are rested on the support parts 121 of the lower housing 100, and the moving body 500 is inserted and held in the lower moving body housing part 110. After that, the upper housing 200 is attached from above the lower housing 100 such that the upper part 560 of the moving body 500 is inserted into the upper moving body housing part 210 of the upper housing 200. By pushing the upper housing 200 toward the lower housing 100, the main body parts 430 of the part to be cut 400 fit into the recessed parts 231 of the upper housing 200. By coupling and fixing the coupling holes B1 and the coupling holes B2 aligned vertically using coupling members or the like, the housing 300 including the lower housing 100 and the upper housing 200 is assembled, with the part to be cut 400 and the moving body 500 housed therein.

The power source P is attached to the power source housing part 221 of the upper housing 200. The power source P is configured such that, when an abnormal signal is input from the outside in response to detecting an abnormal current flowing through the electric circuit, for example, an explosive inside the power source P is exploded to instantaneously push out and move the moving body 500 in the moving body housing part 310 by the air pressure generated by the explosion. Note that the power source P is not limited to a power source using an explosive as long as it generates power for moving the moving body 500, and other known power sources may be used.

Figure 6:
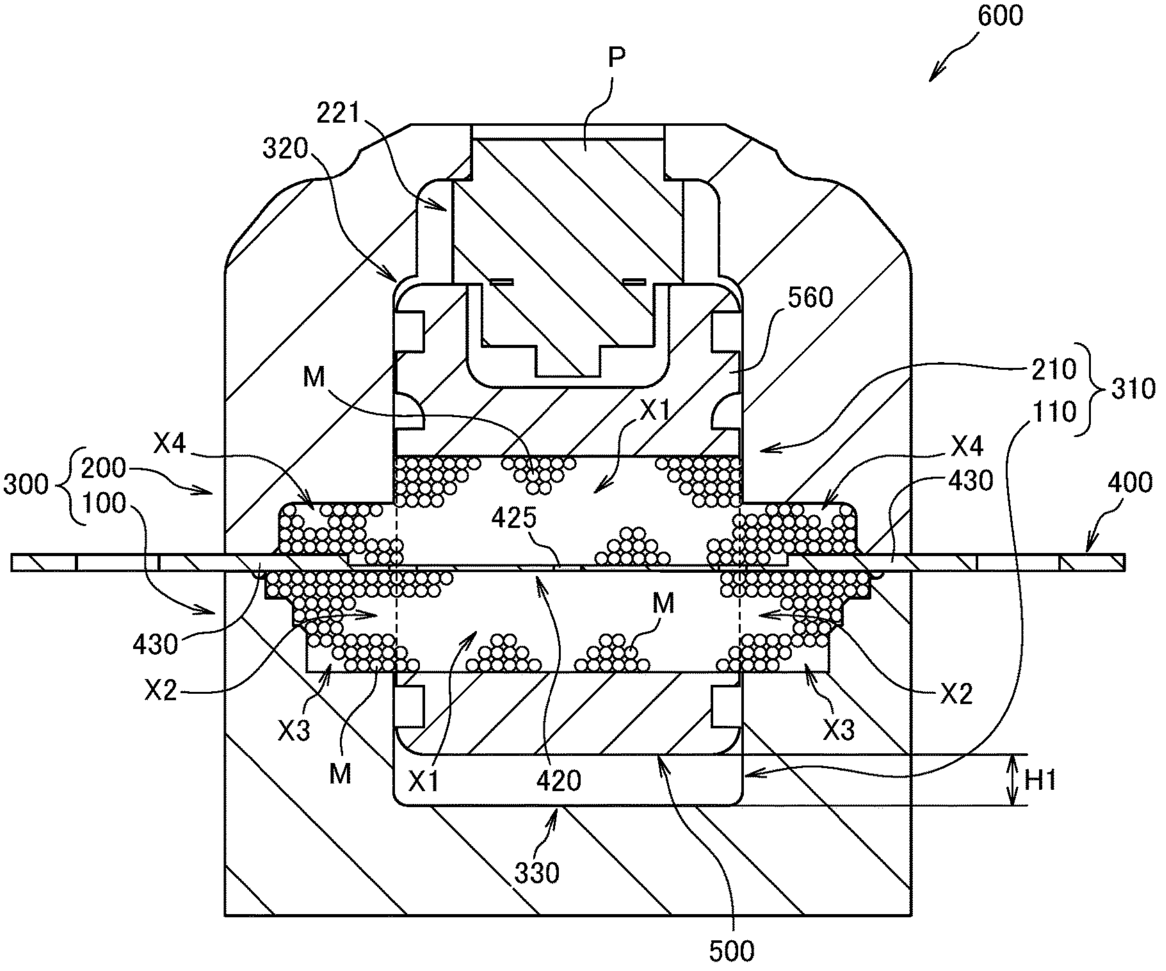
FIG. 6 is a cross-sectional view taken along line A-A of the electric circuit breaker device illustrated in FIG. 5 in an assembled state.

Next, an internal structure of the electric circuit breaker device 600 according to the first embodiment of the present invention will be described with reference to FIG. 6. FIG. 6 is a cross-sectional view taken along line A-A of the electric circuit breaker device 600 illustrated in FIG. 5 in an assembled state.

As illustrated in FIG. 6, the moving body 500 is housed in the moving body housing part 310 including the lower moving body housing part 110 and the upper moving body housing part 210 aligned linearly. The moving body housing part 310 extends from a first end part 320 of the housing 300 to a second end part 330 thereof opposite to the first end part 320. Since the moving body 500 is positioned on the first end part 320 side on which the power source P is located, the second end part 330 side of the moving body housing part 310 is empty. Therefore, as described later, the moving body 500 can move toward the second end part 330 while cutting and separating the separable piece 420. The upper part 560 of the moving body 500 is adjacent to the power source P placed in the power source housing part 221. As will be described later, the air pressure generated by the explosion of the explosive in the power source P is transmitted to the upper part 560 of the moving body 500.

As shown in FIG. 6, a granular arc-extinguishing material M is contained in the first arc-extinguishing space X1, the expanded arc-extinguishing space X2, the outer arc-extinguishing space X3, and the upper expanded space X4. Since the separable piece 420 of the part to be cut 400 is inserted and placed in the first arc-extinguishing space X1 of the moving body 500, the periphery of the fusible part 425 of the part to be cut 400 is covered with the arc-extinguishing material M. The main body parts 430 of the part to be cut 400 are adjacent to the upper expanded space X4 above and the expanded arc-extinguishing space X2 below, and the upper and lower surfaces of each main body part 430 are covered with the arc-extinguishing material M in the upper expanded space X4 and the expanded arc-extinguishing space X2.

Figure 7:
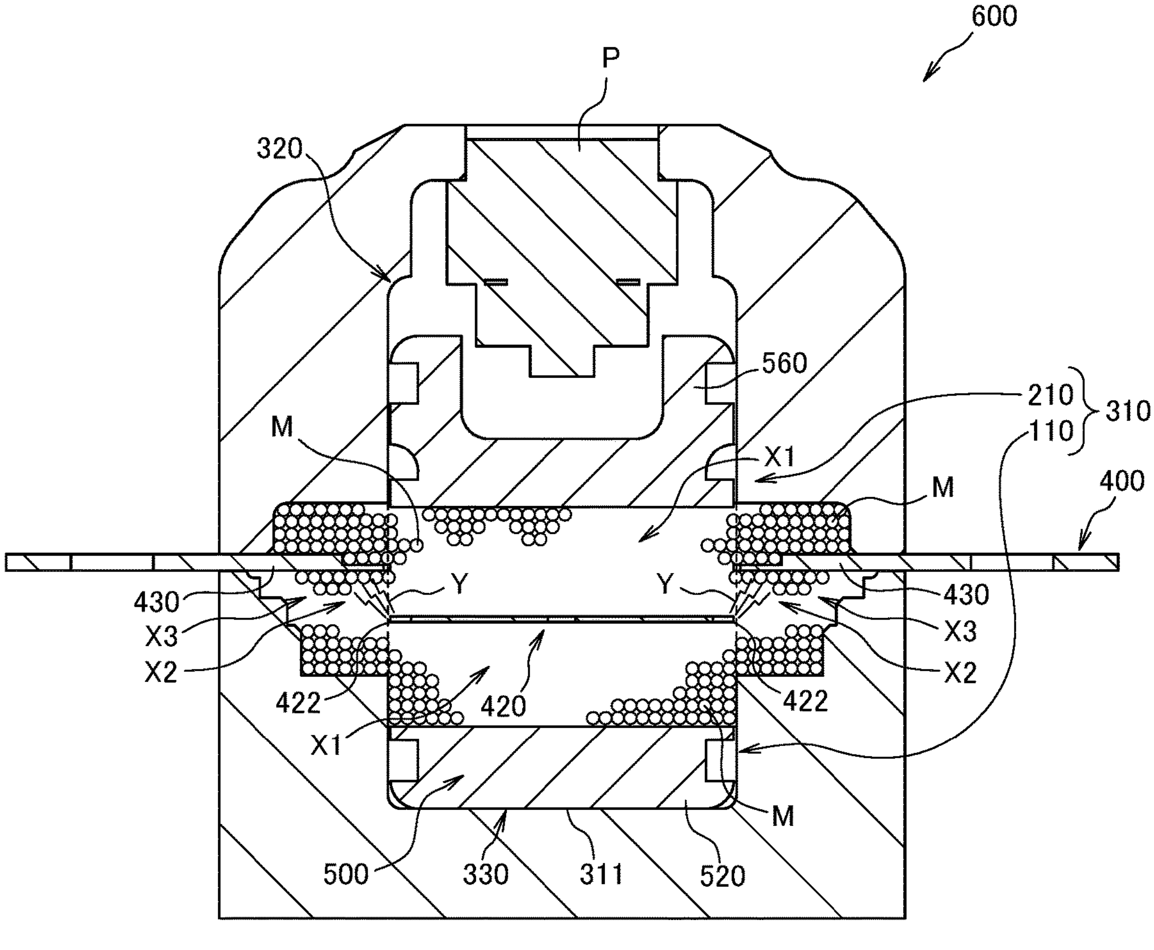
FIG. 7 is a cross-sectional view illustrating the moving body that has moved from the state illustrated in FIG. 6.

In an actual electric circuit breaker device 600, the first arc-extinguishing space X1, the expanded arc-extinguishing space X2, the outer arc-extinguishing space X3, and the upper expanded space X4 are entirely filled with the arc-extinguishing material M, but only part of the arc-extinguishing material M is shown in FIGS. 6 and 7 in consideration of visibility of the drawings. In addition, although the first arc-extinguishing space X1, the expanded arc-extinguishing space X2, the outer arc-extinguishing space X3, and the upper expanded space X4 are filled with the granular solid arc-extinguishing material M such as silica sand, it is not limited thereto. Each space may be filled with an arc-extinguishing material in a liquid form or another form as long as it can effectively extinguish an arc.

When a predetermined abnormal current flows through the electric circuit, the fusible part 425 of the part to be cut 400 connected to the electric circuit generates heat and blows. As a result, the electric circuit is interrupted and protected from excessive current. Further, even if an arc is generated in the vicinity of a remaining part of the fusible part 425 during or after the blowing of the fusible part 425 of the part to be cut 400, the arc is effectively extinguished by the arc-extinguishing material M around the fusible part 425.

As described above, when a predetermined abnormal current flows through the electric circuit, the part to be cut 400 formed of a fuse blows so as to interrupt the electric circuit. On the other hand, when an abnormal current that cannot be interrupted by the fuse flows through the electric circuit, as will be described with reference to FIG. 7, the electric circuit breaker device 600 physically cuts the part to be cut 400 itself. The abnormal excessive current to be interrupted by blowing the fuse and the abnormal excessive current to be interrupted by physically cutting the part to be cut 400 itself by the electric circuit breaker device 600 can be changed as appropriate by changing the rating of the fuse, the setting of the abnormality signal input to the power source P, or the like. Therefore, in the following description, the excessive current at which the part to be cut 400 formed of a fuse blows is referred to as a predetermined first excessive current, and the excessive current at which the electrical circuit breaker device 600 physically cuts the part to be cut 400 itself is referred to as a predetermined second excessive current. The first and second excessive currents can be set to desired values.

As illustrated in FIG. 7, when an abnormality is detected such as the predetermined second excessive current flowing through the electric circuit, an abnormality signal is input to the power source P, and the explosive in the power source P explodes. The air pressure generated by the explosion is instantaneously transmitted to the upper part 560 of the moving body 500. This air pressure vigorously blows away the moving body 500 from the first end part 320 toward the second end part 330, and the moving body 500 instantaneously moves toward the second end part 330 in the moving body housing part 310. The lower part 520 of the moving body 500 abuts on a bottom part 311 of the moving body housing part 310 on the second end part 330 side, and the moving body 500 is stopped so as not to move any more.

The force pushing out the moving body 500 toward the second end part 330 causes the moving body 500 to cut and separate the separable piece 420 from the main body parts 430. Specifically, since the first arc-extinguishing space X1 is filled with the arc-extinguishing material M, when the moving body 500 moves, the separable piece 420 is instantaneously pushed toward the second end part 330 together with the surrounding arc-extinguishing material M with a strong force, and is cut from the main body parts 430. The separable piece 420 moves toward the second end part 330 together with the moving body 500 and is separated from the main body parts 430. Note that the arc-extinguishing material M in the first arc-extinguishing space X1 is not limited to a granular solid arc-extinguishing material such as silica sand, and the arc-extinguishing material can be any material and in any form as long as it can transmit the force exerted when the moving body 500 moves to the separable piece 420 so that the separable piece 420 can be cut off.

As illustrated in FIG. 7, when the moving body 500 has moved and stopped, the expanded arc-extinguishing space X2 faces the end parts 422 of the separable piece 420 that has been cut off and separated. Therefore, even if a high voltage is applied between the main body parts 430 on both sides remaining in the housing 300 without being separated, and arcs Y are generated between the end parts 422 of the separable piece 420 and the main body parts 430, the arcs Y are effectively extinguished by the arc-extinguishing material M in the expanded arc-extinguishing space X2, which makes it possible to prevent the current from flowing through the electric circuit.

Conventionally, a long moving distance has been secured for the moving body to effectively extinguish arcs generated between the separable piece 420 and the main body parts 430 by physically elongating the arcs. On the other hand, according to the present invention, when the moving body 500 has moved and stopped, the end parts 422 of the cut-off separable piece 420 face the expanded arc-extinguishing space X2, and the arcs Y generated between the end parts 422 of the separable piece 420 and the main body parts 430 remaining in the housing 300 without being separated are effectively extinguished by the arc-extinguishing material M in the expanded arc-extinguishing space X2. Since there is no need to secure a long moving distance for the moving body in order to physically elongate and extinguish the arcs as in the related art, the present invention enables downsizing of the electric circuit breaker device 600 by reducing the moving distance of the moving body.

For example, as illustrated in FIGS. 6 and 7, in the electric circuit breaker device 600 of the present invention, a distance H1 the moving body 500 moves is about 2.0 mm (millimeters). On the other hand, the related art has required a distance of about 14.0 mm as the moving distance of the moving body to physically elongate arcs. In the present invention, even if the distance H1 is as short as about 2.0 mm, since the end parts 422 of the cut-off separable piece 420 face the expanded arc-extinguishing space X2, the arcs can be effectively extinguished by the arc-extinguishing material M in the expanded arc-extinguishing space X2 without physically elongating the arcs. Since the distance H1 the moving body 500 can move can be set short, the entire length of the moving body housing part 310 decreases, and as a result, the entire electric circuit breaker device 600 can be downsized.

In addition, the reduced moving distance H1 of the moving body 500 leads to a reduced amount of explosive in the power source P. As a result, the impact caused by the explosion of the explosive can be reduced. This allows the wall thickness of the housing 300 to be reduced, and the manufacturing cost of the electric circuit breaker device 600 can be reduced.

In the present invention, the distance H1 by which the moving body 500 is moved is reduced so that the lower part 520 of the moving body 500 can reach the bottom part 311 of the moving body housing part 310 and stop with higher reliability. Therefore, it is possible to prevent the moving body 500 from not being able to reach the bottom part 311 of the moving body housing part 310 and stopping before the bottom part 311 for reasons such as changes in the voltage or the amount of explosive in the power source P. As a result, the moving distance of the moving body 500 and the state of the separable piece 420 after moving the moving body 500 (such as the distance by which it has been separated from the main body parts 430 and the positional relationship of the separable piece 420 with the expanded arc-extinguishing space X2) become less variable, and the arc-extinguishing performance and the quality of the electric circuit breaker device 600 are stabilized.

Although the lower part 520 of the moving body 500 directly abuts on the bottom part 311 of the moving body housing part 310 to stop the moving body 500, the present invention is not limited thereto. For example, the lower part 520 of the moving body 500 may abut on an impact absorbing material provided on the bottom part 311 of the moving body housing part 310. That is, the lower part 520 of the moving body 500 may indirectly abut on the bottom part 311 of the moving body housing part 310 via the impact absorbing material to stop the moving body 500. Besides this impact absorbing material, any intermediate member placed between the lower part 520 of the moving body 500 and the bottom part 311 of the moving body housing part 310 may be used in order to reduce the moving distance of the moving body 500.

Further, although the lower part 520 of the moving body 500 abuts on the bottom part 311 of the moving body housing part 310 to stop the moving body 500, the present invention is not limited thereto. For example, a contact projection provided on the inner surface of the moving body housing part 310 may enter a contact hole provided on the outer surface 530 of the moving body 500 to establish contact and stop the moving body 500. Any other structure for stopping the moving body 500 can be provided at a suitable position in each of the moving body 500 and the moving body housing part 310 as long as the moving body 500 can be stopped. As described above, a part of the moving body 500 directly or indirectly abuts on a part of moving body housing part 310 so that the moving body 500 can be reliably stopped. As a result, the moving distance of the moving body 500 and the state of the separable piece 420 after moving the moving body 500 (such as the distance by which it has been separated from the main body parts 430 and the positional relationship of the separable piece 420 with the expanded arc-extinguishing space X2) become less variable, and the arc-extinguishing performance and the quality of the electric circuit breaker device 600 are stabilized.

In addition, according to the present invention, since the moving distance H1 of the moving body 500 is reduced, the end parts 422 of the cut-off separable piece 420 face the expanded arc-extinguishing space X2 immediately after the separable piece 420 is cut off, and the arcs Y generated between the end parts 422 of the separable piece 420 and the main body parts 430 are extinguished by the arc-extinguishing material M in the expanded arc-extinguishing space X2. Therefore, it is possible to reduce a sudden counter electromotive force generated immediately after cutting off the separable piece 420. As a result, the load at the time of interruption can be reduced, and the amount of resin forming the electric circuit breaker device 600, and thus the size of the electric circuit breaker device 600 can be further reduced.

When the value of the predetermined second excessive current to be interrupted by the electric circuit breaker device 600 is expected to be about 50 A to 1000 A, the distance H1 the moving body 500 moves is preferably 2 to 5 mm (millimeters). When the distance H1 is 1.5 mm or smaller, it becomes difficult to cut off the separable piece 420 from the main body parts 430. When the distance H1 is 6 mm or larger, not only the moving body housing part 310 increases in size, but also the arcs are extinguished by being physically elongated as in the related art, which increases the risk of a sudden counter electromotive force being generated. However, these values are reference values and vary depending on the design of the part to be cut 400, and the present invention is not limited thereto.

As shown in FIG. 7, when the moving body 500 has moved and stopped, the end parts 422 of the separable piece 420 face the expanded arc-extinguishing space X2 and does not face the inner surface of the moving body housing part 310. Therefore, even if arcs are generated from the end parts 422 of the separable piece 420, it is possible to prevent the inner surface of the moving body housing part 310 from being carbonized by the arcs.

Since the expanded arc-extinguishing space X2 is positioned so as to face the lower side of the main body parts 430, even if a voltage is applied between the main body parts 430 on both sides and arcs are generated from the main body parts 430 toward the end parts 422 of the separable piece 420, the arcs are effectively extinguished by the arc-extinguishing material M in the expanded arc-extinguishing space X2, which makes it possible to effectively prevent the current from flowing through the electric circuit.

Since the expanded arc-extinguishing space X2 extends along the vertical direction in which the moving body 500 moves, the expanded arc-extinguishing space X2 can face the end parts 422 of the separable piece 420 even if the end parts 422 of the separable piece 420 are slightly bent upward or downward when the separable piece 420 is cut off. The arc-extinguishing material M in the expanded arc-extinguishing space X2 can therefore effectively extinguish the arcs generated from the end parts 422.

Since the outer arc-extinguishing space X3 lies outside and adjacent to the expanded arc-extinguishing space X2, and also faces the lower surface of each main body part 430, when the arcs Y extending between the main body parts 430 and the end parts 422 of the separable piece 420 extends beyond the expanded arc-extinguishing space X2, the arc-extinguishing material M in the outer arc-extinguishing space X3 extinguishes the arcs Y. Since the upper expanded space X4 faces the upper surface of each main body part 430, arcs generated upward from the main body parts 430 can be extinguished by the arc-extinguishing material M in the upper expanded space X4.

Second Embodiment

Next, in FIGS. 8 to 11, an electric circuit breaker device 600A of the present invention according to a second embodiment will be described. The configuration of the electric circuit breaker device 600A according to the second embodiment is different from the configuration of the electric circuit breaker device 600 according to the first embodiment in that a part to be cut 400A includes a plurality of separable pieces 420A and that the sizes of a housing 300A and a moving body 500 A are changed in accordance with the size of the part to be cut 400A. Since the rest of the configuration is basically the same as that of the electric circuit breaker device 600 according to the first embodiment, the detailed description of the same part of the configuration will be omitted.

Figure 8A:
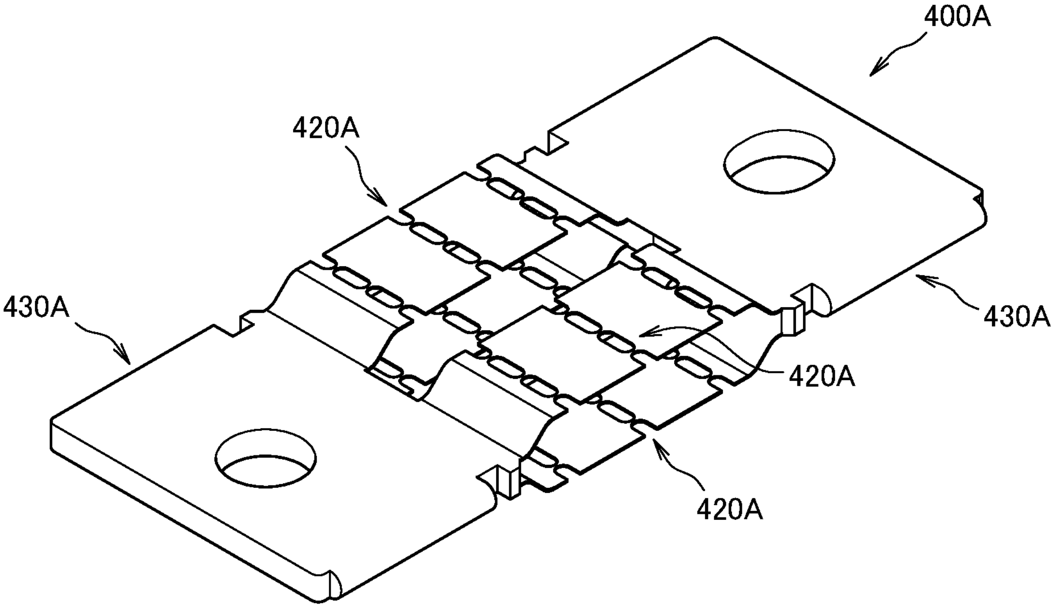
FIG. 8(*a*) is an overall perspective view of a part to be cut of an electric circuit breaker device according to a second embodiment of the present invention, and FIG. 8(*b*) is a plan view of the part to be cut.
Figure 8B:
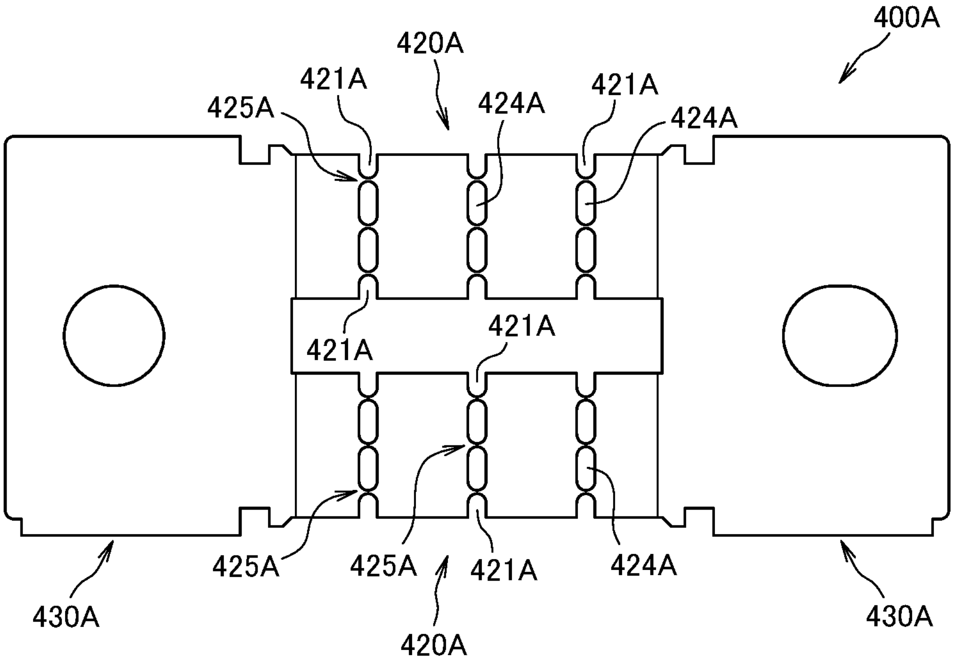

First, the part to be cut 400A forming a part of an electric circuit to be interrupted by the electric circuit breaker device 600A according to the second embodiment of the present invention is illustrated in FIG. 8. FIG. 8(*a*) is a perspective view of the part to be cut 400A, and FIG. 8(*b*) is a plan view of the part to be cut 400A. The part to be cut 400A is entirely made of a metal conductor to be electrically connected with the electric circuit, and includes main body parts 430A to be connected with the electric circuit at both ends, and four separable pieces 420A to be cut off and separated at about the center.

Specifically, at the center and both ends of each separable piece 420A, cuts 421A and through holes 424A are provided to form a fusible part 425A with a locally reduced width. When an abnormal current flows through the electric circuit, the fusible part 425A generates heat and blows. The fusible part 425A thus has a fuse function. The separable pieces 420A are arranged so that two separable pieces 420A face each other in the vertical direction with the main body parts 430A therebetween. Further, two pairs of the separable pieces 420A facing each other are arranged in parallel in the lateral direction of the part to be cut 400 A. Therefore, a total of four separable pieces 420A are connected to the main body parts 430A at both ends, and the rating of the part to be cut 420A can be increased in accordance with the increased number of separable pieces 400A having a fuse function. Although the part to be cut 400A includes a total of four separable pieces 420A, the present invention is not limited thereto. For example, the part to be cut 400A may include only two separable pieces 420A facing each other in the vertical direction, or the part to be cut 400A may include three separable pieces 420A placed on top of each other in the vertical direction with gaps between them. Thus, two or any greater number of separable pieces 420A may be provided between the main body parts 430A in any arrangement.

Figure 9:
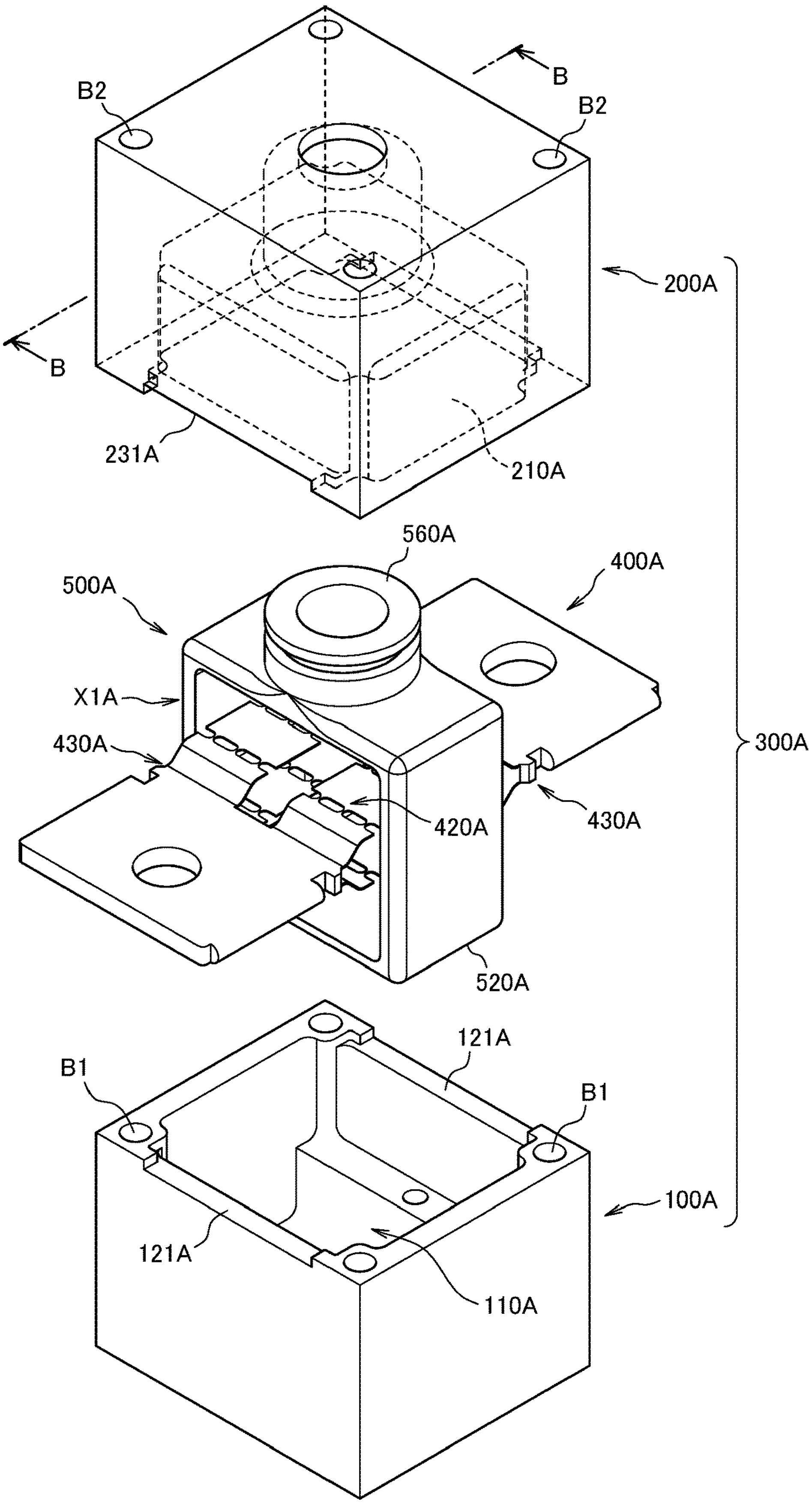
FIG. 9 is an exploded perspective view of the electric circuit breaker device according to the second embodiment of the present invention.

Next, how to assemble the electric circuit breaker device 600A of the present invention will be described with reference to FIG. 9. FIG. 9 shows an exploded perspective view of the electrical circuit breaker device 600A.

First, the main body parts 430A of the part to be cut 400A are inserted into the first arc-extinguishing space X1A of a moving body 500A, and the part to be cut 400A is moved forward until the separable pieces 420A of the part to be cut 400A are housed in a first arc-extinguishing space X1A of the moving body 500A. Note that the moving body 500A has a substantially rectangular parallelepiped shape so that it can house the four separable pieces 400A of the part to be cut 420A, and the first arc-extinguishing space X1A of the moving body 500A is also expanded so that it can house the four separable pieces 420A.

Next, the moving body 500A is inserted into a lower moving body housing part 110A of a lower housing 100A from the lower part 520A side. Then, the main body parts 430A of the part to be cut 400A are rested on support parts 121A of the lower housing 100A, and the moving body 500A is held in such a state that it is inserted in the lower moving body housing part 110A. The configuration of the lower housing 100A is basically the same as the configuration of the lower housing 100 according to the first embodiment, but is different from the configuration of the lower housing 100 according to the first embodiment in that the lower moving body housing part 110A is expanded so as to have a substantially rectangular parallelepiped shape in accordance with the shape of the moving body 500A, and further, the outer arc-extinguishing space X3 is not provided due to the expansion of the lower moving body housing part 110A.

After that, the upper housing 200A is attached from above the lower housing 100A so that the upper part 560A of the moving body 500A is inserted into the upper moving body housing part 210A of the upper housing 200A. By pushing the upper housing 200A toward the lower housing 100A, the main body parts 430A of the part to be cut 400A fit into recessed parts 231A of the upper housing 200A. By coupling and fixing the coupling holes B1 and the coupling holes B2 aligned vertically using coupling members or the like, the housing 300A including the lower housing 100A and the upper housing 200A is assembled, with the part to be cut 400A and the moving body 500A housed therein.

The configuration of the upper housing 200A is basically the same as the configuration of the upper housing 200 according to the first embodiment, but is different from the configuration of the upper housing 200 according to the first embodiment in that the upper moving body housing part 210A is expanded so as to have a substantially rectangular parallelepiped shape in accordance with the shape of the moving body 500A, and further, the outer arc-extinguishing space X3 is not provided due to the expansion of the upper moving body housing part 210A. Although the outer arc-extinguishing space X3 is not provided in the lower housing 100A and the upper housing 200A, the present invention is not limited thereto, and the outer arc-extinguishing space X3 may be provided as appropriate.

Figure 10:
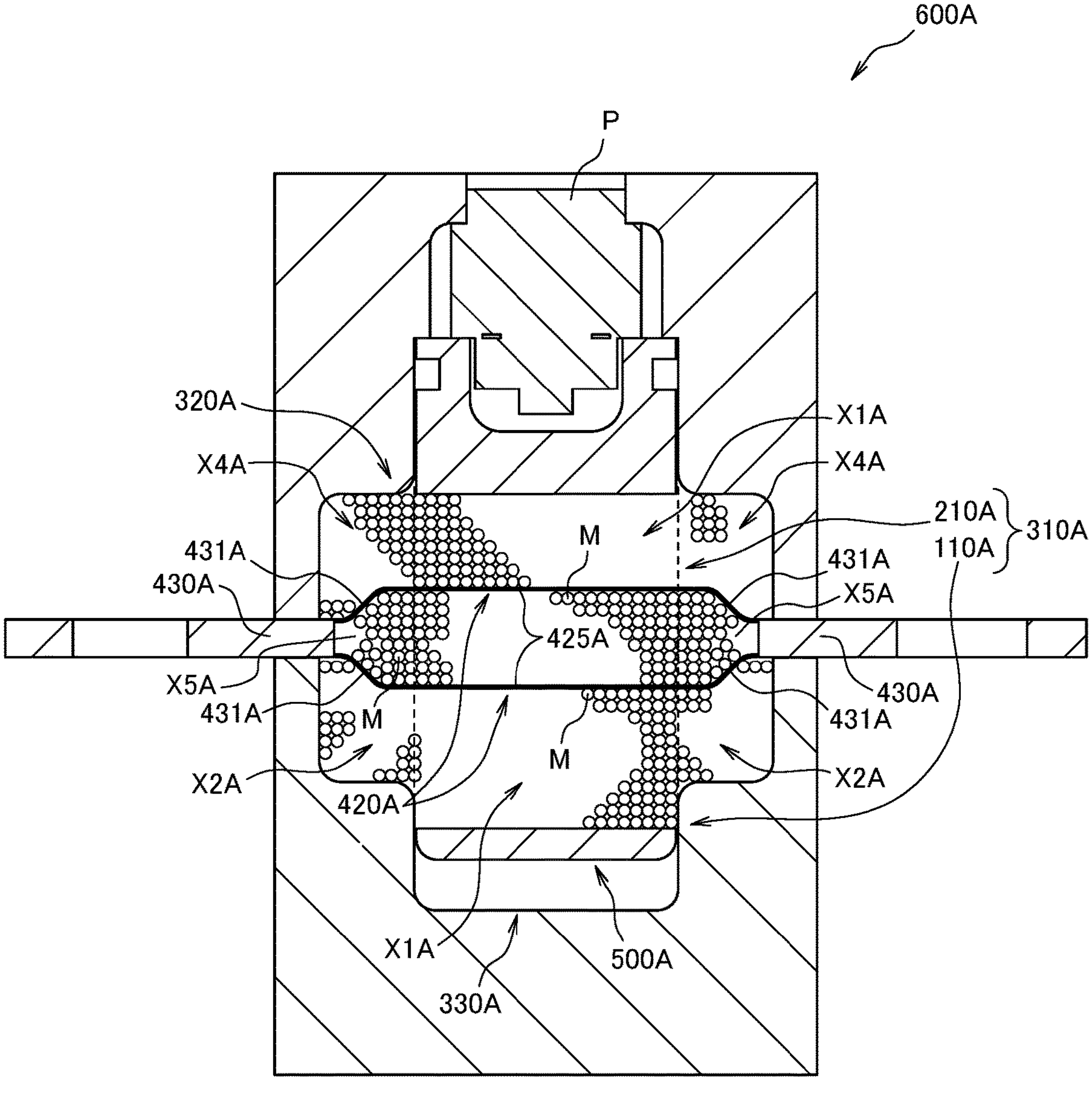
FIG. 10 is a cross-sectional view taken along line B-B of the electric circuit breaker device illustrated in FIG. 9 in an assembled state.
Figure 11:
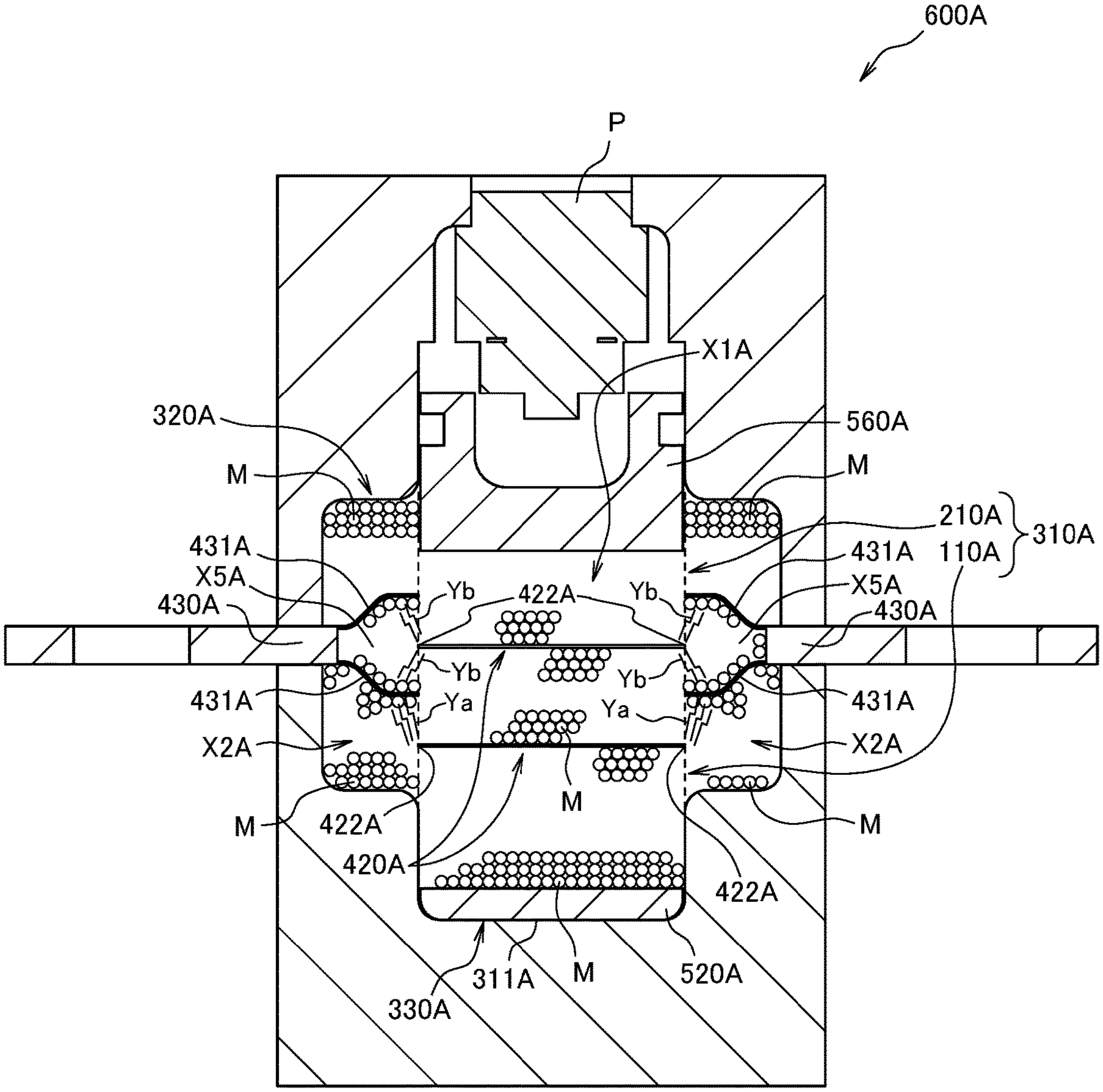
FIG. 11 is a cross-sectional view illustrating the moving body that has moved from the state illustrated in FIG. 10.

Next, an internal structure of the electric circuit breaker device 600A according to the second embodiment of the present invention will be described with reference to FIG. 10. FIG. 10 is a cross-sectional view taken along line B-B of the electric circuit breaker device 600 illustrated in FIG. 9 in an assembled state. In an actual electric circuit breaker device 600A, the first arc-extinguishing space X1A, the expanded arc-extinguishing space X2A, the outer arc-extinguishing space X3A, the upper expanded space X4A, and an intermediate expanded space X5A are entirely filled with the arc-extinguishing material M, but only part of the arc-extinguishing material M is shown in FIGS. 10 and 11 in consideration of visibility of the drawings.

As illustrated in FIG. 10, the moving body 500A is housed in the moving body housing part 310A including the lower moving body housing part 110A and the upper moving body housing part 210A aligned linearly. The moving body housing part 310A extends from a first end part 320A of the housing 300A to a second end part 330A thereof opposite to the first end part 320A. Since the moving body 500A is positioned on the first end part 320A side on which the power source P is located, the second end part 330A side of the moving body housing part 310A is empty.

As shown in FIG. 10, the granular arc-extinguishing material M is contained in the first arc-extinguishing space X1A, the expanded arc-extinguishing space X2A, the outer arc-extinguishing space X3A, and the upper expanded space X4A. The separable pieces 400A of the part to be cut 420A are inserted and housed in the first arc-extinguishing space X1A of the moving body 500A. The gaps between the separable pieces 420A facing each other in the vertical direction are also filled with the arc-extinguishing material M. Therefore, the periphery of each fusible part 425A of the part to be cut 400A is covered with the arc-extinguishing material M.

Upper and lower coupling parts 431A coupling the separable pieces 420A to the main body parts 430A of the part to be cut 400A are adjacent to the upper expanded space X4A above and the expanded arc-extinguishing space X2A below, respectively, so that they are covered with the arc-extinguishing material M in the upper expanded space X4A and the expanded arc-extinguishing space X2A. The upper and lower coupling parts 431A are located in the intermediate expanded space X5A of the housing 300A outside the moving body housing part 310A. This intermediate expanded space X5A between the upper and lower coupling parts 431A is also filled with the arc-extinguishing material M.

As illustrated in FIG. 11, when an abnormality is detected such as the predetermined second excessive current flowing through the electric circuit, an abnormality signal is input to the power source P, and the explosive in the power source P explodes. Then, the air pressure generated by the explosion is instantaneously transmitted to the upper part 560A of the moving body 500A. The moving body 500A is vigorously blown away from the first end part 320A toward the second end part 330A, and instantaneously moves toward the second end part 330A in the moving body housing part 310A. The lower part 520A of the moving body 500A abuts on a bottom part 311A of the moving body housing part 310A on the second end part 330A side, and the moving body 500A is stopped so as not to move any more.

Since the first arc-extinguishing space X1A is filled with the arc-extinguishing material M, when the moving body 500A moves, each separable piece 420A is instantaneously pushed toward the second end part 330A together with the surrounding arc-extinguishing material M with a strong force, and each separable piece 420A is cut from the main body parts 430A. Each separable piece 420A moves toward the second end part 330A together with the moving body 500A and is separated from the main body parts 430A. Since the gaps between the separable pieces 420A facing each other in the vertical direction in the first arc-extinguishing space X1A are also filled with the arc-extinguishing material M, the separable pieces 420A are separated from the main body parts 430A maintaining a distance between each other. Further, the upper and lower coupling parts 431A coupling the separable pieces 420A to the main body parts 430A remain on the main body part 430 side without being cut off.

As illustrated in FIG. 11, when the moving body 500A has moved and stopped, end parts 422A of the lower separable pieces 420A that have been cut off and separated face the expanded arc-extinguishing space X2. Therefore, even if a high voltage is applied between the main body parts 430A on both sides, and arcs Ya are generated between the end parts 422A of the lower separable pieces 420A and the coupling parts 431A of the main body parts 430A, the arcs Ya are effectively extinguished by the arc-extinguishing material M in the expanded arc-extinguishing space X2A, which makes it possible to prevent the current from flowing through the electric circuit. In addition, when the moving body 500A has moved and stopped, end parts 422A of the upper separable pieces 420A that have been cut off and separated face the intermediate expanded space X5A between the coupling parts 431A. Therefore, even if a high voltage is applied between the main body parts 430A on both sides, and arcs Yb are generated between the end parts 422A of the upper separable pieces 420A and the coupling parts 431A of the main body parts 430A, the arcs Yb are effectively extinguished by the arc-extinguishing material M in the intermediate expanded space X5A, which makes it possible to prevent the current from flowing through the electric circuit.

Conventionally, a long moving distance has been secured for the moving body to effectively extinguish arcs generated between the separable pieces 420A and the main body parts 430A by physically elongating the arcs. In particular, in order to elongate the arcs generated between the end parts 422A of the cut-off upper separable pieces 420A and the lower coupling parts 431A, a long moving distance of the moving body was required to move the upper separable pieces 420A farther away from the lower coupling parts 431A. On the other hand, according to the present invention, when the moving body 500A has moved and stopped, the end parts 420A of the cut-off lower separable pieces 422A face the expanded arc-extinguishing space X2A, and the end parts 420A of the cut-off upper separable pieces 422A face the intermediate expanded space X5A between the coupling parts 431A. Therefore, the arcs generated between the end parts 420A of the separable pieces 422A and the main body parts 430A are effectively extinguished by the arc-extinguishing material M in the expanded arc-extinguishing space X2A and the intermediate expanded space X5A. Since there is no need to secure a long moving distance for the moving body in order to physically elongate and extinguish the arcs as in the related art, the present invention enables downsizing of the electric circuit breaker device 600A by reducing the moving distance of the moving body.

Note that, in a case where the part to be cut 400A includes three or more separable pieces 420A placed on top of each other in the vertical direction with gaps between them, when the moving body 500A has moved and stopped, the end parts 422A of at least one separable piece 420A may face the expanded arc-extinguishing space X2A, and the end parts 422A of the other separable pieces 420A may face the intermediate expanded space X5A between the corresponding coupling parts 431A. As a result, the arcs generated between the end parts 422A of the separable pieces 420A and the main body parts 430A are effectively extinguished by the arc-extinguishing material M in the expanded arc-extinguishing space X2A and the intermediate extension space X5A. The electric circuit breaker device 600A can be downsized by reducing the moving distance of the moving body.

The electric circuit breaker device of the present invention is not limited to the above embodiments. Various modifications and combinations are possible within the scope defined by the claims and the scope of embodiments, and these modifications and combinations also fall within the scope of the present invention.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An electric circuit breaker device comprising: a housing; a part to be cut that is placed inside the housing and forms a part of an electric circuit; and a power source placed on a side of a first end part of the housing, the electric circuit breaker device further comprising a moving body that includes a first arc-extinguishing space in which the part to be cut is inserted and housed, and which is filled with an arc-extinguishing material, wherein the housing includes a moving body housing part that allows the moving body to move between the first end part and a second end part opposite to the first end part, the moving body is configured to cut the part to be cut housed in the first arc-extinguishing space of the moving body while moving from the first end part toward the second end part by the power source, the housing includes an expanded arc-extinguishing space positioned so as to face an end part of a separable piece of the part to be cut that is cut off and separated, when the moving body has moved and stopped, the expanded arc-extinguishing space being filled with an arc-extinguishing material, and when the moving body is moved, a main body part of the part to be cut is not separated but remains in the expanded arc-extinguishing space and the expanded arc-extinguishing space houses the main body part such that a circumference of the main body part is filled with the arc-extinguishing material.

2. The electric circuit breaker device according to claim 1, wherein the part to be cut includes a plurality of separable pieces, and when the moving body has moved and stopped, an end part of at least one of the plurality of separable pieces faces the expanded arc-extinguishing space, and an end part of a remaining one or more separable pieces faces an intermediate expanded space provided in the housing and filled with an arc-extinguishing material.

3. The electric circuit breaker device according to claim 1, wherein a part of the moving body directly or indirectly abuts on a part of the moving body housing part to stop the moving body.

4. The electric circuit breaker device according to claim 3, wherein the part to be cut includes a plurality of separable pieces, and when the moving body has moved and stopped, an end part of at least one of the plurality of separable pieces faces the expanded arc-extinguishing space, and an end part of a remaining one or more separable pieces faces an intermediate expanded space provided in the housing and filled with an arc-extinguishing material.

* * * * *